US009844184B2

(12) United States Patent
Johnson et al.

(10) Patent No.: US 9,844,184 B2
(45) Date of Patent: Dec. 19, 2017

(54) HEADER POSITION SENSING SYSTEM FOR AN AGRICULTURAL HARVESTER

(71) Applicant: AGCO Corporation, Hesston, KS (US)

(72) Inventors: Gerald R Johnson, Hesston, KS (US); Quentin Guhr, Hillsboro, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/070,930

(22) Filed: Mar. 15, 2016

(65) Prior Publication Data
US 2016/0270290 A1 Sep. 22, 2016

Related U.S. Application Data

(60) Provisional application No. 62/134,324, filed on Mar. 17, 2015.

(51) Int. Cl.
*A01D 41/14* (2006.01)
*A01D 46/00* (2006.01)
*A01D 75/28* (2006.01)

(52) U.S. Cl.
CPC .................................. *A01D 75/287* (2013.01)

(58) Field of Classification Search
CPC .. A01D 41/141; A01D 75/287; A01D 41/145; A01D 41/14; A01D 41/16; A01D 34/008
USPC ........................................................ 56/10.2 E
See application file for complete search history.

(56) References Cited

U.S. PATENT DOCUMENTS

| 3,731,470 A | * | 5/1973 | Cornish | A01D 75/285 |
| | | | | 280/124.128 |
| 4,612,757 A | * | 9/1986 | Halls | A01D 75/287 |
| | | | | 56/10.2 E |
| 4,641,490 A | | 2/1987 | Wynn et al. | |
| 4,733,523 A | * | 3/1988 | Dedeyne | A01D 75/287 |
| | | | | 56/10.2 E |
| 4,776,153 A | * | 10/1988 | DePauw | A01D 41/145 |
| | | | | 56/10.2 E |
| 5,341,628 A | * | 8/1994 | Schumacher, II | A01D 75/287 |
| | | | | 56/10.2 E |
| 5,359,836 A | * | 11/1994 | Zeuner | A01D 41/141 |
| | | | | 56/10.2 E |
| 5,415,586 A | * | 5/1995 | Hanson | A01D 75/287 |
| | | | | 180/41 |
| 5,464,371 A | * | 11/1995 | Honey | A01D 57/20 |
| | | | | 460/20 |

(Continued)

FOREIGN PATENT DOCUMENTS

| DE | 10140383 A1 | 3/2003 |
| GB | 2098446 A | 11/1982 |

(Continued)

OTHER PUBLICATIONS

UK Intellectual Property Office, International Search Report for related UK Application No. GB1505632.8, dated Sep. 1, 2015.

*Primary Examiner* — Arpad Fabian-Kovacs

(57) ABSTRACT

A system and method for determining the relative position of a header with respect to a chassis of a self-propelled agricultural harvester. Single or dual axis inclinometers are secured to the header and the chassis respectively and signals generated in combination with a stored relationship to header position are used to determine the header position, whether that be the pitch and/or the roll degrees of freedom.

10 Claims, 3 Drawing Sheets

(56) References Cited

U.S. PATENT DOCUMENTS

| | | | | |
|---|---|---|---|---|
| 5,799,483 A * | 9/1998 | Voss | A01D 75/287 460/119 |
| 5,918,448 A * | 7/1999 | Wheeler | A01D 75/287 56/10.2 E |
| 6,073,070 A * | 6/2000 | Diekhans | A01B 79/005 180/167 |
| 6,116,008 A * | 9/2000 | Digman | A01D 41/16 56/15.8 |
| 6,244,024 B1 * | 6/2001 | Diekhans | A01B 69/008 172/4.5 |
| 6,318,057 B1 * | 11/2001 | Burmann | A01D 41/16 56/10.2 R |
| 6,389,785 B1 * | 5/2002 | Diekhans | A01B 69/001 172/4.5 |
| 6,510,680 B2 * | 1/2003 | Uhlending | A01D 75/287 56/10.2 E |
| 6,813,873 B2 * | 11/2004 | Allworden | A01D 41/141 56/10.2 E |
| 6,826,894 B2 * | 12/2004 | Thiemann | A01D 41/141 56/10.2 E |
| 7,430,846 B2 * | 10/2008 | Bomleny | A01D 41/141 56/10.2 E |
| 7,870,709 B2 * | 1/2011 | Digman | A01D 75/287 56/10.2 E |
| 9,192,099 B2 * | 11/2015 | Rittershofer | A01F 12/10 |
| 9,585,309 B2 * | 3/2017 | Posselius | A01D 47/00 |
| 2003/0000193 A1 * | 1/2003 | Beck | A01D 41/141 56/10.2 E |
| 2012/0174549 A1 * | 7/2012 | Schroeder | A01D 41/141 56/10.2 E |
| 2013/0125521 A1 * | 5/2013 | Patterson | A01D 43/04 56/14.5 |
| 2013/0298515 A1 * | 11/2013 | Lohrentz | A01D 47/00 56/51 |
| 2014/0041352 A1 | 2/2014 | Johnson | |
| 2015/0021866 A1 * | 1/2015 | Solbrack | B60G 15/067 280/6.155 |
| 2015/0033692 A1 * | 2/2015 | Schroeder | A01D 41/141 56/10.2 E |
| 2015/0271999 A1 * | 10/2015 | Enns | G05B 15/02 700/275 |

FOREIGN PATENT DOCUMENTS

| | | |
|---|---|---|
| GB | 2187375 A | 9/1987 |
| JP | 2012000082 A | 1/2012 |
| WO | 2013026661 A1 | 2/2013 |

* cited by examiner

HEADER POSITION SENSING SYSTEM FOR AN AGRICULTURAL HARVESTER

RELATED APPLICATION

Under provisions of 35 U.S.C. §119(e), Applicant claims the benefit of U.S. Provisional Application No. 62/134,324, entitled HEADER POSITION SENSING SYSTEM FOR AN AGRICULTURAL HARVESTER and filed Mar. 17, 2015.

BACKGROUND OF THE INVENTION

Field of Invention

The invention relates to systems for sensing the position of a harvesting header with respect to a harvester chassis to which the header is attached. In particular, the invention relates to the measurement of pitch and/or roll of a header with respect to the chassis.

Description of Related Art

Self-propelled agricultural harvesters include combine harvesters, forage harvesters and sugar cane harvesters by way of example. To cut and gather a standing crop, a header is mounted at the front of the machine. Headers which are too wide to travel on public highways or through gateways are commonly detachable for transport on a separate trailer.

Headers are typically mounted to the front end of a feederhouse which houses a crop conveying elevator for transporting the cut crop material to crop processing apparatus. The feederhouse is commonly mounted upon the vehicle frame or chassis so as to be pivotally moveable about a transverse axis thus allowing the header to be raised and lowered as required.

It is known also to provide a header attachment frame or interface frame at the front end of the feederhouse upon which the header is removeably attached. The header attachment frame may be moveable with the respect to the feederhouse about one or two axes of freedom to permit fore and aft pitch adjustment or lateral tilt or roll adjustment of the header with respect to the feederhouse and thus the chassis. Such functionality is provided to permit accurate positioning of the header and particularly the cutterbar without disrupting the level of the chassis. This is of particular benefit in combine harvesters in which means are provided to self-level the grain cleaning sieves. For example, it is known to provide chassis-levelling or shoe-levelling mechanics. By permitting adjustment of the pitch and roll of the header the self-levelling function can be left unaffected.

To facilitate accurate control of the pitch and/or roll of the header, system knowledge of the current pitch or roll values is required. Machines today include mechanical linkages coupled to sensors to measure these parameters. However, the sensors and linkages add complexity and a higher component count and are especially prone to failure in the dirty operating environment.

OVERVIEW OF THE INVENTION

It is an object of the invention to provide an improved header position sensing system which at least alleviates the aforementioned problems.

In accordance with a first aspect of the invention there is provided a header position sensing system comprising a first inclinometer mounted relative to a chassis of a self-propelled agricultural harvester, and a second inclinometer mounted relative to a header which is mounted to a front end of a feederhouse of the harvester, wherein the system calculates a position of an attached header with respect to the chassis from signals generated by the first and second inclinometers.

The use of solid state inclinometers dispenses with the need for analogue sensors and cumbersome mechanical linkages to generate a signal representative of header position. It should be understood inclinometers sense angular displacement with respect to a gravitational reference. To generate an accurate representation of the header angle with respect to the chassis irrespective of the slope upon which the machine is located, a pair of inclinometers are employed with one sensing the angular position of the header whilst the second inclinometer senses the angular position of the chassis or frame. Using geometric principles the relative position of the header with respect to the chassis can be calculated.

The inclinometers provided in accordance with the invention can be utilised to measure pitch and/or roll of the header with respect to the chassis.

In a first embodiment, the first and second inclinometers are arranged to measure pitch, that is, angular position around a transverse axis with respect to the forward direction of travel of the harvester. If no header attachment frame is provided, the inclinometer may be secured to the feederhouse or to the header where in the pitch changes as the feeder house is raised and lowered. Where an attachment frame is provided which permits pitch adjustment with respect to the feeder house, the inclinometer may be mounted directly to the attachment frame so as to generate a signal that is representative of an attached header without any electrical connections required to the header, thus enabling simple detachment.

In a second embodiment, the first and second inclinometers are arranged to measure lateral tilt wherein the system calculates the lateral tilt of an attached header with respect to the chassis. The freedom to adjust lateral tilt is commonly provided by means of an attachment frame coupled to the front of the feederhouse. In this case, the second inclinometer is preferably mounted to the header attachment frame so as to generate a signal representative of the lateral tilt of the header.

In a third embodiment, the first and second inclinometers are dual-axis inclinometers and are each arranged to measure both pitch and roll. By employing dual axis devices the part count of the system is reduced thus saving cost and complexity. A measurement of both pitch position and tilt position of the header can be obtained using only two solid state sensors thus significantly reducing the complexity with respect to known systems.

The system uses geometric principles to calculate a position of an attached header with respect to the chassis from signals generated by the inclinometers. The system preferably comprises storage means configured to store a positional relationship between the chassis and the header for a given delta value which corresponds to the difference between the first and second inclinometers. It will be appreciated that the signals generated by the inclinometers are affected by any slope or incline over which the harvesting machine is operating. The system aims to calculate a header position irrespective of the operating incline and thus utilises a delta value based upon the two measurements accordingly.

The system may store a lookup table which comprises a set of header positions and the corresponding delta values. In this case the look up table can be employed to determine the position of the attached header based upon the calculated delta value.

It should be understood that use herein of the term "header position" may correspond to angular pitch or angular roll or cutterbar height.

In accordance with a second aspect of the invention a method of determining the relative position of a header with respect to a chassis of a self-propelled agricultural harvester to which with header is attached, the method comprising sensing an angle of the chassis with respect to gravity, sensing an angle of the header with respect to gravity, and calculating the position of the header with respect to the chassis from the sensed angles. The invention involves the sensing of an angular parameter with respect to gravity and utilises a pair of sensed values to calculate the relative position of the header with respect to the chassis.

BRIEF DESCRIPTION OF DRAWINGS

Further aspects of the invention will become apparent from reading the following description of specific embodiments with reference to the appended drawings in which.

DETAILED DESCRIPTION OF SPECIFIC EMBODIMENTS

The following description will make reference to relative terms such as "longitudinal", "transverse" "front" and "rear" and these will be made with reference to the normal forward direction of travel of the harvesting machine described.

Figure 1:
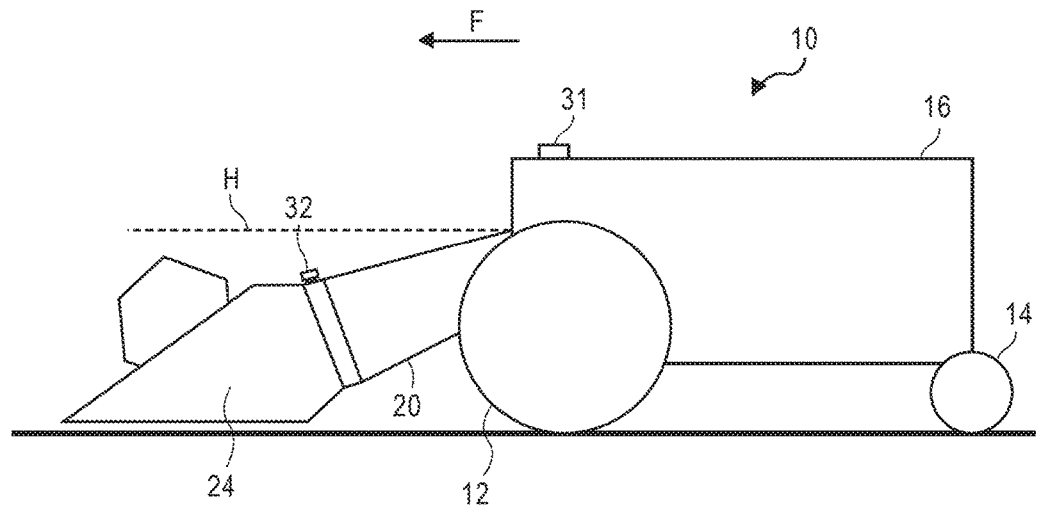
FIG. 1 is highly schematic side view of a self-propelled agricultural harvester on level ground and embodying a header position sensing system in accordance with the invention.

With reference to FIG. 1 a self-propelled agricultural harvester 10 is represented in highly schematic form. The harvester 10 is shown to comprise front wheels 12, rear wheels 14 and a frame or chassis 16. It should be understood that the harvester 10 shown represents a host of different harvesters to which the invention can apply. For example, harvester 10 may be a combine harvester, a forage harvester or a windrower.

Figure 3:
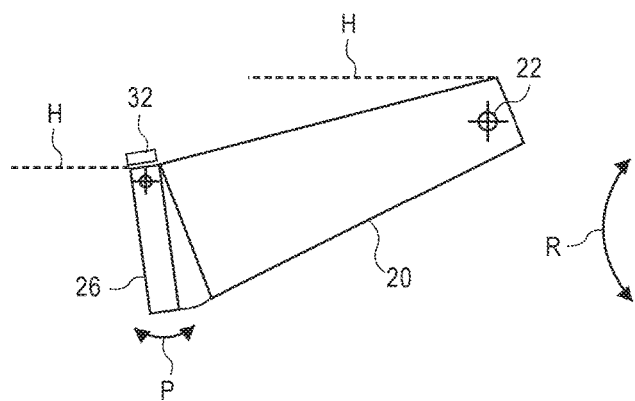
FIG. 3 is a schematic side view of a feederhouse and header attachment frame.

The harvester 10 proceeds in a normal forward direction of travel represented by arrow F and comprises, at its front end, a feederhouse 20 which is pivotally mounted in a known manner to the chassis 16 for movement around a generally transverse axis 22 (FIG. 3). Feederhouse 20 provides at its front end means to attach a removable header 24. The header 24 may comprise a leading cutterbar and may comprise means to gather the crop to a central zone from where it is conveyed into the front of the feederhouse 20.

Figure 4:
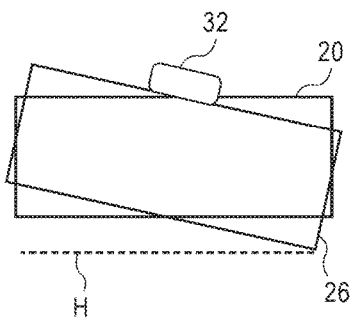
FIG. 4 is a schematic front view of a feederhouse and header attachment frame illustrating lateral tilt functionality.

As is known, header 24 may be secured to the front of feederhouse 20 by means of a header attachment frame 26 which permits adjustment of the pitch and roll of the header 24 with respect to feederhouse 20. FIG. 3 illustrates the pitch freedom of movement about a generally transverse axis 28, the freedom of movement being represented by arrow P. FIG. 4 illustrates the roll freedom of movement between the attachment frame 26 and feederhouse 20, the freedom of movement being represented by arrow R.

Figure 2:
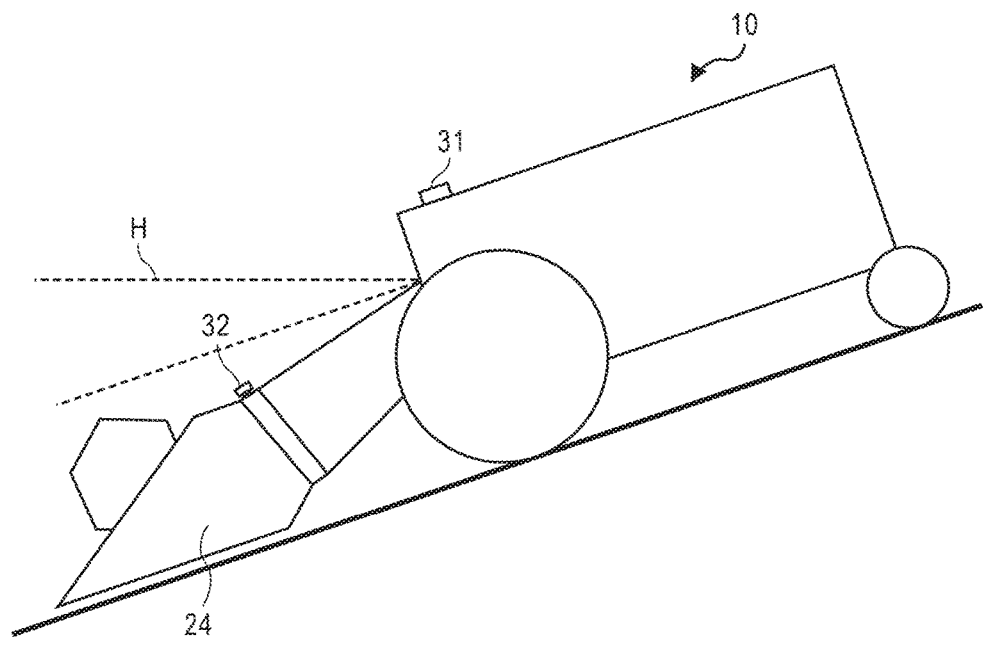
FIG. 2 shows the agricultural harvester of FIG. 1 operating on a downhill slope.
Figure 5:
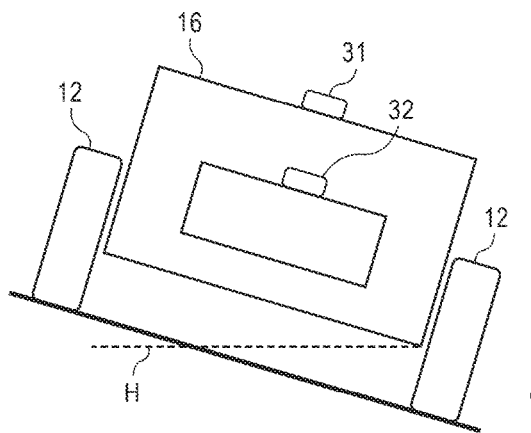
FIG. 5 is a schematic front view of the harvester of FIG. 1 operating on a side bank and shown with the header detached for reasons of clarity.
Figure 6:
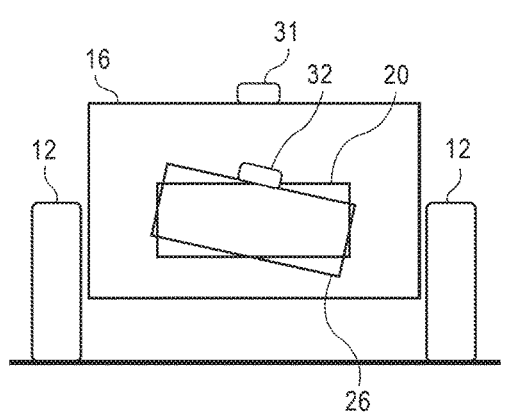
FIG. 6 is a schematic front view of the harvester of FIG. 1 operating on level ground but illustrating the lateral tilt functionality.

For ease of understanding hereinafter, the harvester 10 may operate on uphill and downhill slopes as illustrated in FIG. 2 and/or on side banks as illustrated in FIG. 5. The slopes and inclines are defined with respect to a gravitational horizontal represented by dashed lines H throughout the drawings.

Figure 7:
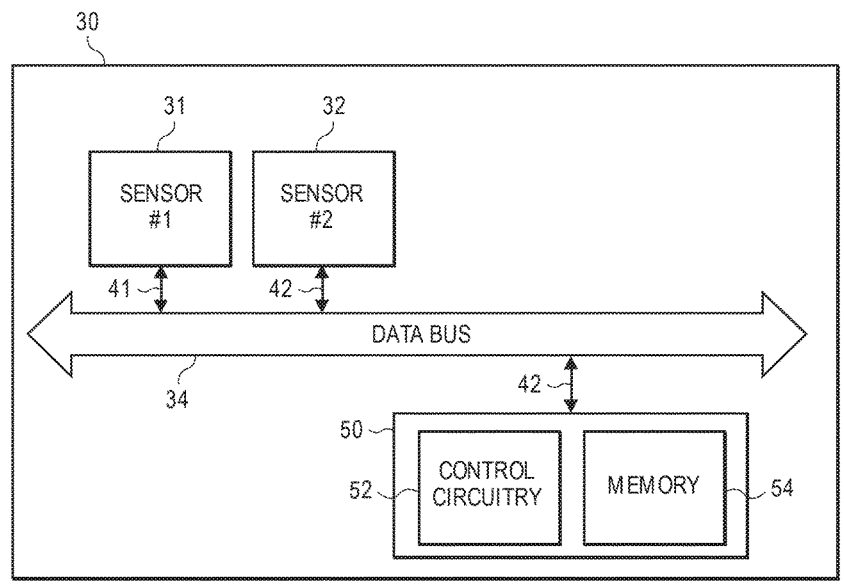
FIG. 7 is block diagram of header position sensing system in accordance with an embodiment of the invention; and, FIG. 8 is a process flow in accordance with an example method of the invention.
Figure 8:
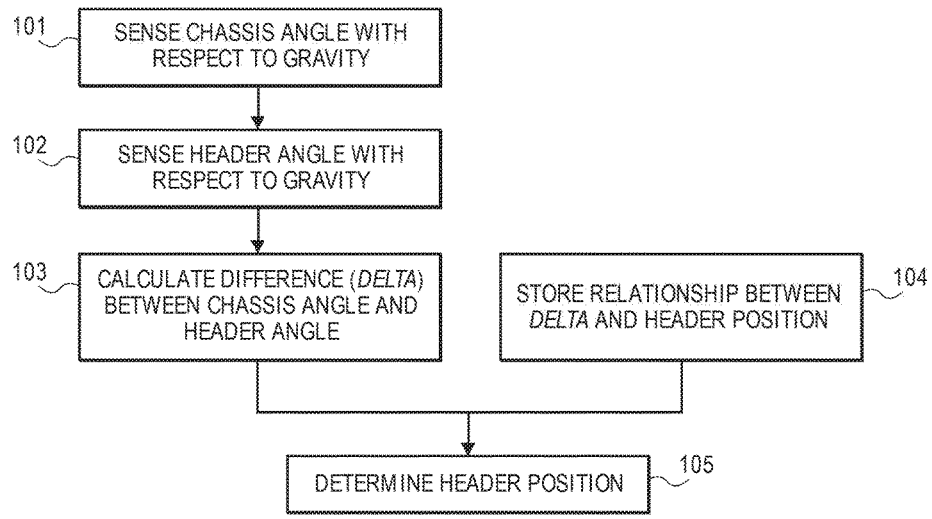

In accordance with a preferred embodiment of the invention, harvester 10 is fitted with a header position sensing system 30 as represented by the block diagram of FIG. 7. The system 30 comprises a first inclinometer 31 secured relative to the chassis 16 and a second inclinometer 32 secured relative to header 24.

First inclinometer 31 may be secured to the harvester 10 at any suitable location so as to generate a signal that is representative of the angular position of the chassis with respect to gravity. Similarly, second inclinometer 32 can be secured to any part of the harvester 10 which moves in a fixed relationship relative to header 24. As shown in the example embodiment, second inclinometer 32 is preferably secured to the header attachment frame 26 which moves in fixed positional relationship with respect to header 24. However it should be understood that second inclinometer 32 may instead be secured directly to header 24 but requiring electrical connections back to the main harvester which may hinder the detachment of the header 24.

Both inclinometers 31,32 are of a dual axis type and are arranged on respective parts of harvester 10 to sense angular position around a transverse axis (pitch) and angular position around a longitudinal axis (roll).

Inclinometers 31,32 are connected to a data bus 34 via a wiring harness or wireless connection represented by arrows 41,42. System 30 further comprises an electronic control unit (ECU) 50 which includes control circuitry 52 and electronic storage or memory 54. ECU 50 is connected to data bus 34 by a wired or wireless link 43.

In a first process step 101, system 30 senses the pitch and roll angle of chassis 16 with respect to gravity by means of first inclinometer 31. Two signals representative of the sensed pitch and roll angle are communicated from the first inclinometer 31 to the ECU 50. In a second process step 102 the second inclinometer 32 senses the angular pitch and roll of the header 24 with respect to gravity and communicates signals representing such to the ECU 50.

In a third process step 103 the control circuitry 52 calculates a difference, or delta, value between the sensed chassis angle and the sensed header angle for both the pitch and roll measurements.

In a fourth process step 104 a look-up table is stored in the memory 54, the table storing a set of delta values and corresponding header positions. Separate look-up tables may be stored for pitch and roll parameters respectively.

In a fifth process step 105 the calculated delta values and the stored look-up tables are interrogated to determine the pitch and roll positions of the header 24. The determined header position may be communicated to other control circuitry and/or communicated to the operator via a display device.

The illustrated embodiment utilises dual axis inclinometers. However it should be understood that single axis inclinometers may be used instead without deviating from the scope of the invention. Furthermore, the invention is applicable to harvesters without header attachment frames, that is where the header 24 is secured directly to the feederhouse 20 and no freedom of relative movement is permitted. In this case, single axis inclinometers may still be employed to determine the pitch of header 24 with respect to chassis 16. In a further alternative, the header attachment frame 26 may be constructed so as to permit only one of roll and pitch freedom.

In summary there is provided a system and method for determining the relative position of a header with respect to a chassis of a self-propelled agricultural harvester. Single or dual axis inclinometers are secured with respect to the header and the chassis respectively and signals generated thereby in combination with a stored relationship to header position are used to determine the header position, whether that be the pitch and/or the roll degrees of freedom. The use of inclinometers dispenses with the need for analogue sensors and mechanical linkages and provides a low cost solid state solution which is robust and reliable.

The invention claimed is:

1. A header position sensing system comprising:
   a first inclinometer mounted relative to a chassis of a self-propelled agricultural harvester; and
   a second inclinometer mounted relative to a header which is mounted to a front end of a feederhouse of the harvester; and
   an electronic control unit in communication with the first inclinometer and the second inclinometer and configured to receive a first signal from the first inclinometer and a second signal from the second inclinometer, wherein the electronic control unit calculates a position of the header with respect to the chassis using the first signal and the second signal.

2. A system according to claim 1, wherein both the first and second inclinometers are arranged to measure pitch.

3. A system according to claim 1, wherein the header is attached to a header attachment frame which is mounted to a front end of the feederhouse so as to permit relative movement between the header attachment frame and the feederhouse, wherein the second inclinometer is mounted on the header attachment frame.

4. A system according to claim 1, wherein both the first and second inclinometers are arranged to measure lateral tilt.

5. A system according to claim 4, wherein both the first and second inclinometers are dual axis inclinometers and are each arranged to measure pitch and lateral tilt.

6. A system according to claim 1, further comprising storage means configured to store a positional relationship between the chassis and the header attachment frame for a given delta value which corresponds to the difference between the first and second inclinometers.

7. A self-propelled agricultural harvester comprising a header height sensing system according to claim 1.

8. A method of determining the relative position of a header with respect to a chassis of a self-propelled agricultural harvester to which the header is attached, the method comprising:
   sensing, using a first inclinometer mounted relative to a chassis, an angle of the chassis with respect to gravity;
   sensing, using a second inclinometer mounted relative to a header, an angle of the header with respect to gravity;
   receiving, using an electronic control unit, a first signal from the first inclinometer and a second signal from the second inclinometer; and
   calculating, using the electronic control unit, the position of the header with respect to the chassis using the first signal and the second signal.

9. A method according to claim 8, wherein the second inclinometer is mounted on a header attachment which is mounted to a front end of a feederhouse so as to permit relative movement between the header attachment frame and the feederhouse.

10. A method according to claim 8, further comprising the steps of using the electronic control unit to generate a delta value by calculating the difference between the sensed angle of the chassis and the sensed angle of the header, to store a relationship between a given delta value and the corresponding positional relationship between the chassis and header, and to determine the positional relationship between the chassis and header from the calculated delta value and the stored relationship.

* * * * *